Figure 1:
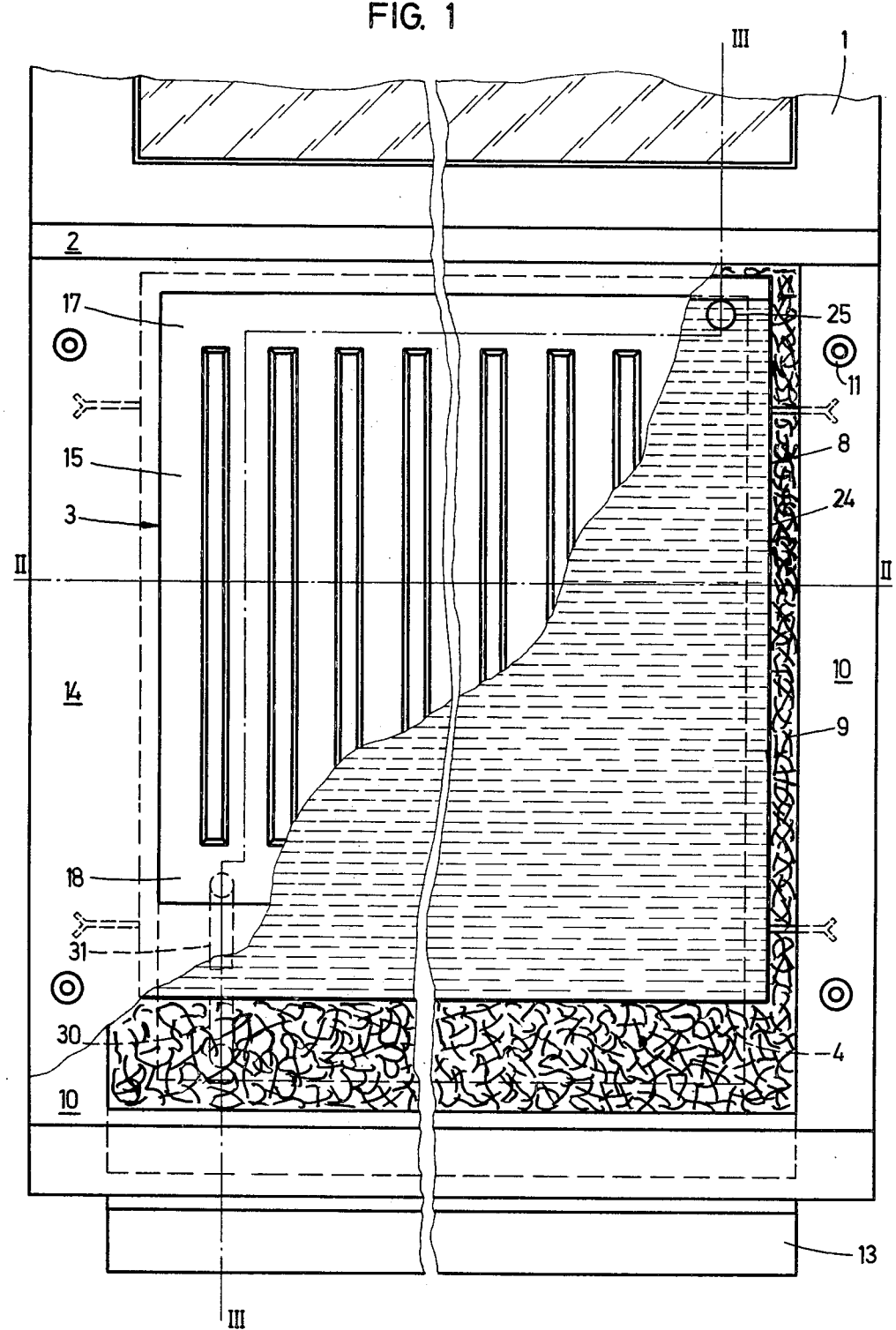

United States Patent [19]

Staudacher

[11] 4,183,350

[45] Jan. 15, 1980

[54] PREFABRICATED OUTER WALL ELEMENT

[76] Inventor: Werner Staudacher, Bantigerstrassse 19a, Zollikofen, Switzerland

[21] Appl. No.: 796,147

[22] Filed: May 12, 1977

[30] Foreign Application Priority Data

May 20, 1976 [CH] Switzerland ............... 6372/76

[51] Int. Cl.$^2$ .................................................. F24J 3/02
[52] U.S. Cl. ..................................... 126/430; 126/431
[58] Field of Search ............... 126/270, 271; 237/1 A; 165/49, 53; 137/625.5, 564, 630.17

[56] References Cited

U.S. PATENT DOCUMENTS

| | | | |
|---|---|---|---|
| 3,850,200 | 11/1974 | Flebu | 137/625.5 |
| 3,994,278 | 11/1976 | Pittinger | 126/270 |
| 4,003,367 | 1/1977 | Wikholm | 126/271 |
| 4,029,258 | 6/1977 | Groth | 126/270 |
| 4,050,508 | 9/1977 | Buckley | 237/1 A |
| 4,083,490 | 4/1978 | Cunningham et al. | 126/271 |

Primary Examiner—James C. Yeung
Attorney, Agent, or Firm—Zarley, McKee, Thomte, Voorhees & Sease

[57] ABSTRACT

A prefabricated outer wall element for the construction of buildings, which element comprises a radiator disposed on the inner side thereof, a flat solar radiation collector disposed on the outer side thereof, and a heat accumulator disposed within the wall element between the radiator and the solar collector. First communicating means are provided for forming a first circuit for a heat carrier between the collector and the heat accumulator in order to store the heat received by the collector, and second communicating means are provided for forming a second circuit for the heat carrier between the heat accumulator and the radiator in order that the heat received by the collector and stored in the accumulator may be supplied to the radiator with a certain time-lag.

3 Claims, 4 Drawing Figures

PREFABRICATED OUTER WALL ELEMENT

This invention relates to a prefabricated outer wall element of the type having an inner side, an outer side, and a radiator disposed on the inner side.

Among the known prefabricated outer wall elements, Swiss Patent No. 567,653 teaches a form comprising an upper window portion and a lower panel portion separated by a middle portion. This element is used in the construction of buildings having air-conditioned rooms and is provided with slots, disposed on the inner side of the panel portion, for exhausting warm room air, and with a duct for supplying the exhausted room air to the space between the panes of a double-glass window. At the top of the window portion is an opening for exhausting the room air flowing through the aforementioned space. The exhaust air from the air-conditioned room is utilized for improving the thermal insulation of the wall element.

Swiss Patent No. 529,271 describes a window-wall element for a building having an air-conditioning plant. This element comprises spaced outer and inner wall portions, in each of which there is a glazed window opening. Secured below the window of the inner wall portion is a radiator which can be connected to the flow- and return-pipes of the building's heating plant. Between the outer and inner wall portions is an exhaust air duct through which exhaust air from the air-conditioned room is conveyed to the outside.

It is an object of this invention to provide an improved prefabricated outer wall element of the type initially mentioned which makes is possible to utilize solar radiation for auxiliary heating of the room which is bounded in part by that outer wall element.

To this end, in the prefabricated outer wall element according to the present invention, the improvement comprises a solar radiation collector disposed on the outer side, a heat accumulator disposed between the radiator and the solar radiation collector, first communicating means for forming a first heat-carrier circuit between the collector and the accumulator, and second communicating means for forming a second heat-carrier circuit between the accumulator and the radiator.

Figure 2:
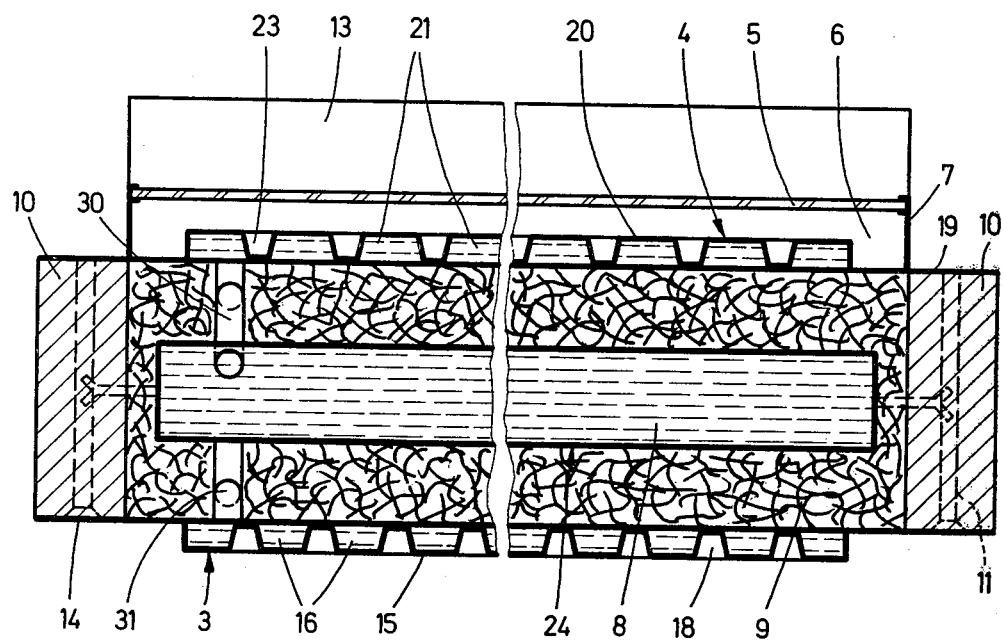
Figure 3:
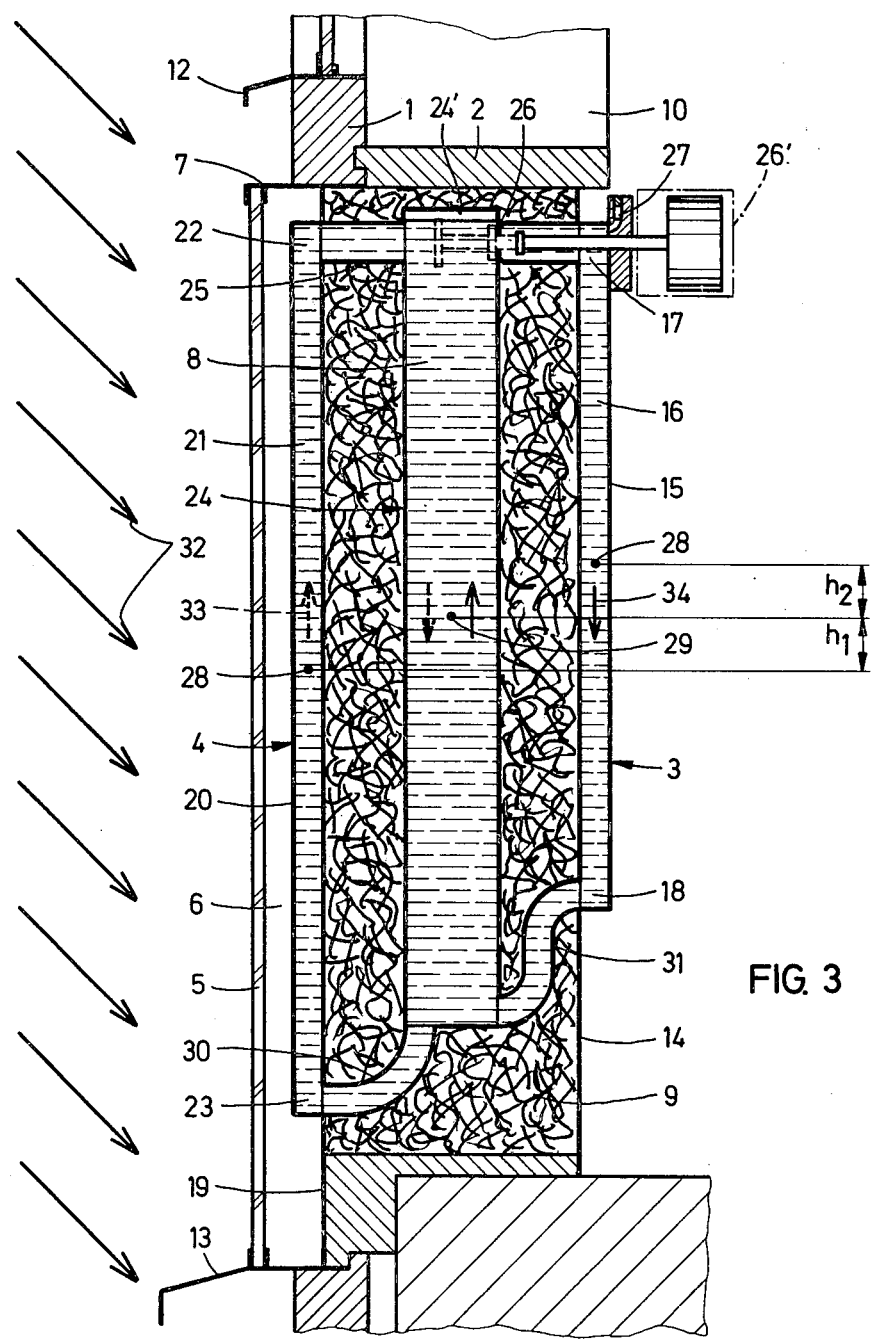
Figure 4:
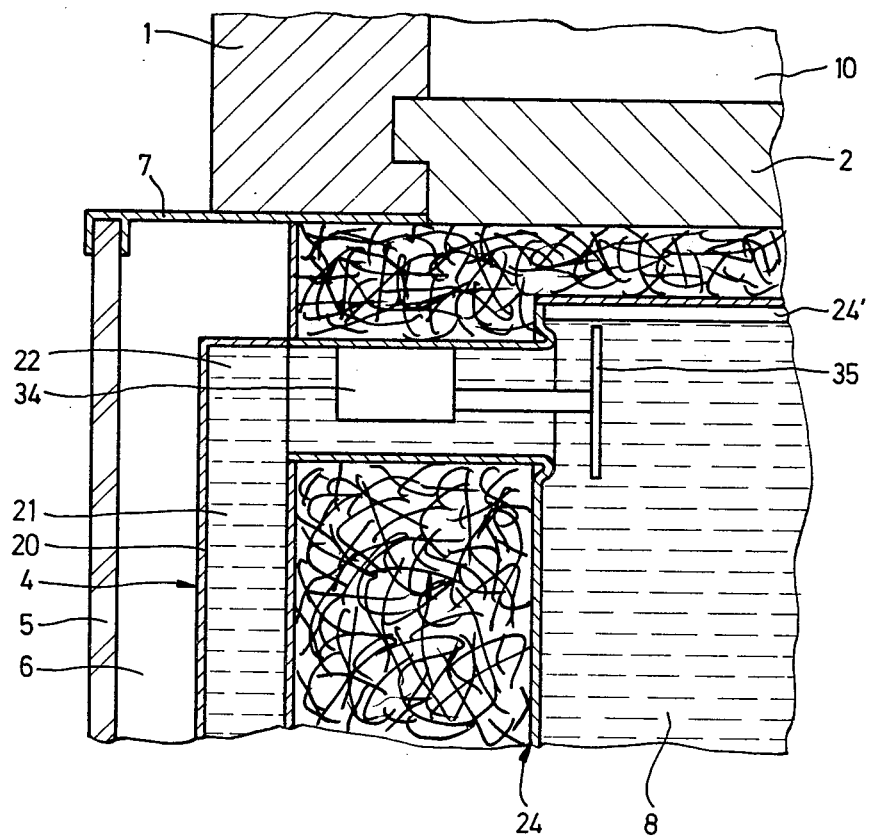

Preferred embodiments of the invention will now be described in detail with reference to the accompanying drawings, in which:

FIG. 1 is an elevation of the inner side of a wall element according to a first embodiment of the invention, partially broken away in order to show the internal structure, FIG. 2 is a section taken on the line II—II of FIG. 1, FIG. 3 is a section taken on the line III—III of FIG. 1, and FIG. 4 is a partial section, analogous to FIG. 3, through a wall element according to a second embodiment of the invention.

A window portion of the illustrated wall element is only partially visible in FIGS. 1 and 3. It comprises a window frame 1 surrounding, preferably, a double-glass window. The window and panel portions of the wall element are separated by a window sill 2. A radiator 3 is disposed on the inner side of the panel portion, and a solar radiation collector 4, preferably designed similarly to radiator 3, is situated on the outer side of the wall element. Collector 4 is entirely covered by a transparent pane 5, e.g., of glass, so that as little as possible of the heat received by collector 4 is lost to the outside atmosphere. Pane 5 is held by a frame 7 surrounding collector 4.

Disposed between collector 4 and radiator 3 is a heat accumulator 8 embedded in a thermally insulating material 9 which gives the wall element the necessary coefficient of thermal insulation and insulates accumulator 8 from both collector 4 and radiator 3. On each side of the wall element a supporting upright 10 extends along the entire height of the panel portion. A number of bores 11 in each upright 10 are used for securing the wall element to the building structure.

The lower horizontal portion of window frame 1 bears a weather-strip 12 (FIG. 3), and a larger weather-strip 13 is provided at the bottom of the wall element.

Radiator 3 comprises a base plate 14, preferably of metal, which may cover the entire inner side of the panel portion of the wall element. A corrugated sheet-metal cover 15 is welded to base plate 14. The cross-section of cover 15 is clearly visible in FIG. 2. Together with base blase 14, cover 15 forms a number of vertically-running ducts 16, the upper ends of which open into a horizontally-disposed accumulator vessel 17, and the lower ends of which open into a horizontally-disposed distributor vessel 18. Solar radiation collector 4 is similarly constructed; it comprises a base plate 19 to which a corrugated sheet-metal cover 20 is welded, thus forming vertically-running ducts 21. The upper and lower ends of ducts 21 open into a horizontally-disposed accumulator vessel 22 and a horizontally-disposed distributor vessel 23, respectively.

Instead of the radiator 3 and collector 4 described above, it is also possible to use other designs in which the vertically-running ducts and the horizontal vessels are formed by pipe pieces welded to base plates 4 and 19, respectively. The ducts may also be replaced by a single serpentine pipe welded to the base plate, in which case the vessels may be omitted. Base plates 14 and 19 preferably serve as supporting elements for the panel portion of the wall element.

Heat accumulator 8 consists essentially of a recipient 24 for a heat carrier, preferably water, to which an anti-freeze agent has been added. Accumulator vessel 22 of collector 4 communicates with the top of recipient 24 via a pipe piece 25. Accumulator vessel 17 of radiator 3 can be connected to the top of recipient 24 via a valve 26. The valve 26 shown in FIG. 3 is manually adjustable and includes a filling tube 27 for filling recipient 24, collector 4, and radiator 3 with the heat carrier. A portion 24' of recipient 24 is situated at a higher level than collector 4, radiator 3, and the inlet opening of filling tube 27 so that an air cushion remains when the heat carrier is introduced, portion 24' serving as an expansion space.

The height of recipient 24 is less than that of collector 4, and the height of the radiator 3 is less than that of recipient 24. Collector 4 and radiator 3 are so disposed that the centers of gravity—represented by dots 28—of the quantities of heat carrier contained therein are situated at different heights, the center of gravity of the amount in radiator 3 being situated higher than that of the amount in collector 4. The center of gravity 29 of the quantity of heat carrier contained in recipient 24 is preferably situated at a height midway between the two centers of gravity 28, so that the differences in height are $h_1$ and $h_2$, respectively, with $h_1$ being equal to $h_2$. Recipient 24 communicates with distributor vessel 23 of collector 4 via a pipe piece 30, as well as with distributor vessel 18 of radiator 3 via a pipe piece 31.

A first circuit for the heat carrier is formed by solar radiation collector 4, pipe piece 25, recipient 24, and pipe piece 30; and a second circuit is formed by radiator 3, pipe piece 31, recipient 24, and valve 26. When the solar rays, represented by arrows 32 in FIG. 3, strike solar radiation collector 4 through pane 5—the outer surface of collector 4 being as dark as possible in color—the heat carrier contained therein is heated and flows into vertical ducts 21, upward as indicated by a dashed-line arrow 33 into accumulator vessel 22, and thence through pipe piece 25 into the top of recipient 24, while the still-cold portion of the heat carrier at the bottom of recipient 24 flows through pipe piece 30 into distributor vessel 23 of collector 4.

Whenever the sun is shining, some of the solar radiation also penetrates into the room through the window, which is shown only in part, so that the room is thereby directly additionally heated without further steps being taken. Hence it is expedient to close valve 26 during insolation so that the second circuit through radiator 3 is interrupted. The heat carrier in recipient 24 is then gradually heated, and the heat taken up is stored because recipient 24 is surrounded by thermally insulating material 9. In the evening, when there is no longer any insolation and hence no direct additional heating of the room through the window, valve 26 is opened so that the heated carrier can flow through valve 26 into distributor vessel 17 of radiator 3 and down through the vertically-running ducts 16, as indicated by an arrow 34 in FIG. 3. Radiator 3 radiates the heat stored in heat accumulator 8 into the room, while the cooled heat carrier is collected from all ducts 16 in accumulator vessel 18 and conveyed through pipe piece 31 into the bottom of recipient 24.

In order to prevent heat stored in heat accumulator 8 from being lost to the outside atmosphere via collector 4 in the absence of solar radiation, valve 26 may be replaced by a double valve having a valve rod extending into recipient 24 and two valve disks, as indicated in dashed lines in FIG. 3. One of the valve disks can close the opening of pipe 25 into recipient 24, while the other can close the inlet opening of the valve. In the two end positions of the valve, either the mouth of pipe piece 25 is open and the valve inlet opening closed, or vice versa.

Valve 26 may be controlled by a thermostat 26', shown in dot-dash lines in FIG. 3, so as to open when the room temperature drops below a pre-adjustable level. In another particularly preferred embodiment of the invention (FIG. 4), a thermostat 34 controlling a valve 35 may be disposed in pipe piece 25, which valve automatically closes whenever the temperature of the heat carrier in the upper portion of collector 4 drops below, say, 18° C.

Instead of including a window, the upper portion of the wall element may comprise only a thermally insulating panel.

The prefabricated outer wall element described above is relatively simple in construction and hence inexpensive to manufacture. No further installations, such as inlet and outlet lines for the heat carrier, are necessary. Except for the valve or valves, there are no elements with mechanically moved parts. The heat carrier circulates in the two circuits owing to the difference in weight between the cold and heated portions thereof. Owing to the arrangement of solar radiation collector 4, heat accumulator 8, and radiator 3 in a relatively compact space, there is no need for a feed pump. Each prefabricated outer wall element represents a complete auxiliary heating unit.

Compared with prior art solar radiation collectors intended to be installed on the roof of a buidling and necessitating relatively extensive additional equipment involving substantial investment, the prefabricated outer wall element described above eliminates such additional costs completely. One great advantage of these wall elements is that the useful surface area increases with the number of stories of the building, whereas in the case of prior art installations having solar radiation collectors mounted on the roof, the useful surface area remains the same regardless of the number of stories.

Although it is obviously not feasible to do without conventional heating means when the above-described wall element is used, the latter does provide an auxiliary means of heating dependent upon the incident solar radiation, thus making possible an appreciable saving on heating costs in return for a relatively low investment.

What is claimed is:

1. In a prefabricated outer wall element of the type having an inner side, an outer side, and a radiator disposed on said inner side, the improvement comprising:
    a solar radiation collector disposed on said outer side,
    a heat accumulator disposed between said radiator and said solar radiation collector,
    first communicating means for forming a first heat carrier circuit between said collector and said accumulator,
    second communicating means for forming a second heat carrier circuit between said accumulator and said radiator, and
    a filling tube for introducing a heat carrier into said heat accumulator, said solar radiation collector, and said radiator, said filling tube being so disposed with respect to said heat accumulator that said heat accumulator cannot be completely filled with said heat carrier, whereby an unfilled space is left in said heat accumulator to serve as expansion space, the height of said radiator being less than the height of said heat accumulator and the height of said accumulator being less than the height of said solar radiation collector.

2. The wall element of claim 1, further comprising heat carrier fluid substantially filling said radiator, solar radiation collector and heat accumulator,
    said radiator, solar radiation collector and heat accumulator being disposed relative to one another such that the center of gravity of heat carrier fluid within the solar radiation collector is disposed vertically below the center of gravity of heat carrier fluid within the radiator, the center of gravity of heat carrier fluid within the heat accumulator being disposed vertically between said aforementioned centers of gravity.

3. The wall element of claim 2 wherein the center of gravity of heat carrier fluid within said heat accumulator is disposed midway between the centers of gravity of heat carrier fluid within said solar radiation collector and radiator.

* * * * *